United States Patent
Matsumura et al.

(10) Patent No.: US 12,010,542 B2
(45) Date of Patent: Jun. 11, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 388 days.

(21) Appl. No.: 17/599,376

(22) PCT Filed: Mar. 29, 2019

(86) PCT No.: PCT/JP2019/014333
§ 371 (c)(1),
(2) Date: Sep. 28, 2021

(87) PCT Pub. No.: WO2020/202394
PCT Pub. Date: Oct. 8, 2020

(65) Prior Publication Data
US 2022/0150745 A1    May 12, 2022

(51) Int. Cl.
*H04W 24/10*    (2009.01)
*H04B 17/318*    (2015.01)
*H04B 17/336*    (2015.01)

(52) U.S. Cl.
CPC .......... *H04W 24/10* (2013.01); *H04B 17/318* (2015.01); *H04B 17/336* (2015.01)

(58) Field of Classification Search
CPC ..... H04W 24/10; H04W 24/08; H04W 16/28; H04B 17/318; H04B 17/336; H04B 7/0632; H04B 7/0695
See application file for complete search history.

(56) References Cited

U.S. PATENT DOCUMENTS

| | | | |
|---|---|---|---|
| 9,155,098 B2* | 10/2015 | Geirhofer | H04W 72/51 |
| 2015/0215022 A1* | 7/2015 | Nagata | H04L 5/0057 |
| | | | 370/329 |
| 2015/0358094 A1* | 12/2015 | Yi | H04W 72/54 |
| | | | 370/252 |
| 2019/0342058 A1* | 11/2019 | Kwak | H04L 1/08 |
| 2021/0400677 A1* | 12/2021 | Lee | H04L 5/005 |
| 2022/0183079 A1* | 6/2022 | Ouchi | H04W 16/14 |
| 2022/0190977 A1* | 6/2022 | Lee | H04B 17/336 |

(Continued)

OTHER PUBLICATIONS

Office Action issued in the counterpart Chinese Application No. 201980096801.3, mailed May 6, 2023 (16 pages).

(Continued)

*Primary Examiner* — Abdullahi Ahmed
(74) *Attorney, Agent, or Firm* — Osha Bergman Watanabe & Burton LLP

(57) ABSTRACT

A user terminal includes a control section that measures a plurality of Signal to Interference plus Noise Ratios (SINRs), based on one or more signal measurement resources and a plurality of interference measurement resources, and a transmitting section that reports one or more SINRs among the plurality of the SINRs and one or more indices associated with the resources used for the one or more SINRs. According to one aspect of the present disclosure, appropriate beam reporting can be performed.

7 Claims, 14 Drawing Sheets

(56) References Cited

U.S. PATENT DOCUMENTS

2023/0318676 A1* 10/2023 Matsumura .......... H04W 24/10
370/329

OTHER PUBLICATIONS

Notification of Reasons for Refusal issued in Japanese Application No. 2021-511768, mailed on Apr. 11, 2023 (8 pages).
Qualcomm Incorporated: "Maintenance for CSI Measurement"; 3GPP TSG RAN WG1 Meeting #93, R1-1807339, Busan, Korea, May 21-25, 2018 (9 pages).
International Search Report issued in PCT/JP2019/014333 on May 21, 2019 (1 page).
Written Opinion of the International Searching Authority issued in PCT/JP2019/014333 on May 21, 2019 (3 pages).
Huawei, HiSilicon; "Beam measurement and reporting using L1-SINR"; 3GPP TSG RAN WG1 Meeting #95, R1-1813560; Spokane, USA; Nov. 12-16, 2018 (4 pages).
NTT Docomo, Inc.; "Discussion on multi-beam enhancement"; 3GPP TSG RAN WG1 Meeting #95, R1-1813867; Spokane, USA; Nov. 12-16, 2018 (16 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

```
CSI-ReportConfig ::=            SEQUENCE {
    reportConfigId                  CSI-ReportConfigId,
    carrier                         ServCellIndex                           OPTIONAL, -- Need S
    resourcesForChannelMeasurement  CSI-ResourceConfigId,
    csi-IM-ResourcesForInterference CSI-ResourceConfigId                    OPTIONAL, -- Need R
    nzp-CSI-RS-ResourcesForInterference CSI-ResourceConfigId                OPTIONAL, -- Need R
    ...
    reportQuantity                  CHOICE {
        none                            NULL,
        cri-RI-PMI-CQI                  NULL,
        cri-RI-i1                       NULL,
        cri-RI-i1-CQI                   SEQUENCE {
            pdsch-BundleSizeForCSI          ENUMERATED {n2, n4}             OPTIONAL
        },
        cri-RI-CQI                      NULL,
        cri-RSRP                        NULL,
        ssb-Index-RSRP                  NULL,
        cri-RI-LI-PMI-CQI               NULL
    }, ...
    }, ...
    groupBasedBeamReporting         CHOICE {
        enabled                         NULL,
        disabled                        SEQUENCE {
            nrofReportedRS                  ENUMERATED {n1, n2, n3, n4}     OPTIONAL -- Need S
        }
    }, ...
}
```

FIG. 1

```
reportQuantity            CHOICE {
    none                              NULL,
    cri-RI-PMI-CQI                    NULL,
    ...
    cri-RI-CQI                        NULL,
    cri-RSRP                          NULL,
    ssb-Index-RSRP                    NULL,
    cri-RI-LI-PMI-CQI                 NULL,
    cri-SINR                          NULL,
    ssb-Index-SINR                    NULL,
    cri-RSRP-SINR                     NULL,
    ssb-Index-RSRP-SINR               NULL,
    cri-imr-Index-SINR                NULL,
    ssb-Index-imr-Index-SINR          NULL,
    cri-imr-Index-RSRP-SINR           NULL,
    ssb-Index-imr-Index-RSRP-SINR     NULL,
    imr-Index                         NULL
},
```

FIG. 5

```
reportQuantity                          CHOICE {
    none                                    NULL,
    cri-RI-PMI-CQI                          NULL,
    ...
    cri-RSRP                                NULL,
    ssb-Index-RSRP                          NULL,
    cri-RI-LI-PMI-CQI                       NULL
},
reportQuantity-r16                      CHOICE {
    none                                    NULL,
    cri-RI-PMI-CQI                          NULL,
    cri-RI-i1                               NULL,
    ...
    cri-RI-CQI                              NULL,
    cri-RSRP                                NULL,
    ssb-Index-RSRP                          NULL,
    cri-RI-LI-PMI-CQI                       NULL,
    cri-SINR                                NULL,
    ssb-Index-SINR                          NULL,
    cri-RSRP-SINR                           NULL,
    ssb-Index-RSRP-SINR                     NULL,
    cri-imr-Index-SINR                      NULL,
    ssb-Index-imr-Index-SINR                NULL,
    cri-imr-Index-RSRP-SINR                 NULL,
    ssb-Index-imr-Index-RSRP-SINR           NULL,
    imr-Index                               NULL
},
```

FIG. 6

USER TERMINAL AND RADIO COMMUNICATION METHOD

TECHNICAL FIELD

The present disclosure relates to a user terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

In existing LTE systems (for example, LTE Rel. 8 to Rel. 13), a user terminal (User Equipment (UE)) periodically and/or aperiodically transmits channel state information (CSI) to a base station. The UE transmits the CSI by using an uplink control channel (Physical Uplink Control Channel (PUCCH)) and/or an uplink shared channel (Physical Uplink Shared Channel (PUSCH)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), methods of beam management (BM) have been studied. As to the beam management, a study is underway to perform beam selection based on an L1-RSRP (a reference signal received power (RSRP) of a physical layer (layer 1)) reported by a UE.

In addition, using result of beam measurement (such as interference measurement) other than the L1-RSRP is also under study. However, investigations of a specific method for notifying a UE and other methods, for performing such new beam selection/reporting, are still not advanced. When such selection/reporting cannot be performed, the beam selection may not be appropriately conducted, and this may cause occurrence of problems such as reduction in communication throughput.

In the light of this, the present disclosure has one object to provide a user terminal and a radio communication method capable of appropriately performing beam reporting.

Solution to Problem

A user terminal according to one aspect of the present disclosure includes a control section that measures a plurality of Signal to Interference plus Noise Ratios (SINRs), based on one or more signal measurement resources and a plurality of interference measurement resources, and a transmitting section that reports one or more SINRs among the plurality of the SINRs and one or more indices associated with the resources used for the one or more SINRs.

Advantageous Effects of Invention

According to one aspect of the present disclosure, appropriate beam reporting can be performed.

BRIEF DESCRIPTION OF DRAWINGS

FIG. 1 is an extract of RRC information elements "CSI-ReportConfig";

FIG. 5 is a diagram to show examples of report quantities for reporting at least one of SINRs and IMR indices;

FIG. 6 is a diagram to show other examples of report quantities for reporting at least one of SINRs and IMR indices;

DESCRIPTION OF EMBODIMENTS

Figure 2:
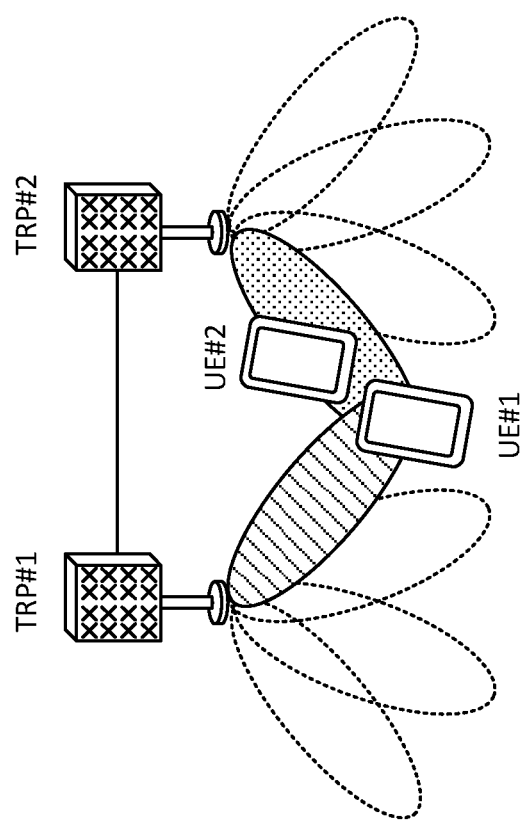
FIG. 2 is a diagram to show an example of beam selection based on RSRP.

In NR, a UE measures a channel state by using a certain reference signal (or a resource for the reference signal) and feeds back (reports) channel state information (CSI) to a base station.

The UE may measure the channel state by using a channel state information reference signal (Channel State Information-Reference Signal (CSI-RS)), a synchronization signal/broadcast channel (Synchronization Signal/Physical Broadcast Channel (SS/PBCH)) block, a synchronization signal (SS), a demodulation reference signal (DeModulation Reference Signal (DMRS)), or the like.

The CSI-RS resource may include at least one of a non zero power (NZP) CSI-RS and a CSI-Interference Management (Measurement) (IM). The SS/PBCH block is a block including a synchronization signal (for example, primary synchronization signal (PSS)), a secondary synchronization signal (SSS), and a PBCH (and a corresponding DMRS) and may be referred to as an "SS block (SSB)."

Note that the CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), Layer 1 (L1)-Reference Signal Received Power (RSRP) (reference signal received power of layer 1), L1-Reference Signal Received Quality (RSRQ), L1-Signal to Interference plus Noise Ratio (Signal-to-Noise and Interference ratio, SINR), L1-Signal to Noise Ratio (SNR), and so on.

The CSI may have a plurality of parts. A first part of CSI (CSI part 1) may contain information of relatively small number of bits (for example, RI). A second part of CSI (CSI part 2) may contain information of relatively large number of bits (for example, CQI), such as information determined based on CSI part 1.

The methods for feeding back the CSI under study are, for example (1) periodic CSI (P-CSI) reporting, (2) aperiodic CSI (A (AP)-CSI) reporting, and (3) semi-persistent CSI reporting (SP-CSI) reporting.

The UE may be notified of information relating to CSI reporting (which may be referred to as "CSI reporting configuration information") by using higher layer signaling, physical layer signaling (for example, downlink control information (DCI)), or a combination thereof. The CSI reporting configuration information may be configured by using an RRC information element "CSI-ReportConfig," for example.

Here, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (MAC PDU), or the like. The broadcast information may be, for example, a master information block (MIB), a system information block (SIB), minimum system information (Remaining Minimum System Information (RMSI)), other system information (OSI), or the like.

The CSI reporting configuration information may contain, for example, information relating to a report period, an offset, and so on, and these may be represented in terms of a certain time unit (slot unit, subframe unit, symbol unit, or the like). The CSI reporting configuration information may contain configuration ID (CSI-ReportConfigId), and a parameter such as the type of the CSI reporting method (for example, whether it is SP-CSI) or a report period, may be identified by the configuration ID. The CSI reporting configuration information may contain information indicating the signal (or resource for the signal) for reporting measured CSI (CSI-ResourceConfigId).

(Beam Management)

For Rel-15 NR, methods of beam management (BM) have been studied. As to the beam management, a study is underway to perform beam selection based on an L1-RSRP reported by a UE.

Changing (switching) a beam of a certain signal/channel may correspond to changing (Transmission Configuration Indication state) of the signal/channel.

Note that the beam that is selected by the beam selection may be a transmission beam (Tx beam) or a reception beam (Rx beam). The beam that is selected by the beam selection may be a beam of UE or a beam of a base station.

The UE may report (transmit) measurement result for the beam management, by using a PUCCH or a PUSCH. The measurement result may be, for example, CSI containing at least one of an L1-RSRP, an L1-RSRQ, an L1-SINR, an L1-SNR, and so on. The measurement result may be referred to as "beam measurement," "beam measurement result," "beam report," "beam measurement report," and so on.

CSI measurement for beam reporting may include interference measurement. The UE may measure channel quality, interference, and so on, by using the resource for CSI measurement, and may derive a beam report. The resource for CSI measurement may be at least one of, for example, a resource of SS/PBCH block, a resource of CSI-RS, other reference signal resources, and the like. The configuration information of the CSI measurement report may be configured to the UE by using higher layer signaling.

The beam report may contain result of at least one of channel quality measurement and interference measurement. The result of channel quality measurement may contain an L1-RSRP, for example. The result of interference measurement may contain L1-SINR, L1-SNR, L1-RSRQ, other indices relating to interference (for example, any indices other than the L1-RSRP), and so on.

Note that the resource for CSI measurement for the beam management may be referred to as a "beam measurement resource." The signal/channel on which the CSI measurement is performed may be referred to as a "beam measurement signal." The CSI measurement/reporting may be interpreted as at least one of measurement/reporting for the beam management, beam measurement/reporting, radio link quality measurement/reporting, and so on.

The CSI reporting configuration information in consideration of current NR beam management is described with reference to FIG. 1. FIG. 1 is an extract of RRC information elements "CSI-ReportConfig." FIG. 1 is illustrated by using ASN. 1 (Abstract Syntax Notation One) notation (the same applies to FIGS. 5 and 6 which are described later).

The CSI reporting configuration information (CSI-ReportConfig) may contain a "report quantity" (which may be represented as an RRC parameter "reportQuantity") being information of a parameter to be reported. The report quantity is defined by the type of ASN. 1 object: "choice." Thus, one of parameters (cri-RSRP, ssb-Index-RSRP, and so on) defined as report quantities is configured.

The UE, in which a higher layer parameter (for example, an RRC parameter "groupBasedBeamReporting") contained in the CSI reporting configuration information is configured to "enabled," may add, to the beam report, a plurality of beam measurement resource IDs (such as SSBRI and CRI) and a plurality of corresponding measurement results (such as L1-RSRPs), for each report configuration.

The UE, in which one or more numbers of RS resources to be reported are configured by a higher layer parameter (for example, an RRC parameter "nrofReportedRS") contained in the CSI reporting configuration information, may add, to the beam report, one or more beam measurement resource IDs and one or more corresponding measurement results (such as L1-RSRPs), for each report configuration.

In Rel-15 NR, among the report quantities, cri-RSRP and ssb-Index-RSRP relate to the beam management. The UE, to which cri-RSRP is configured, reports a CRI and an L1-RSRP corresponding to the CRI. The UE, to which ssb-Index-RSRP is configured, reports an SSBRI and an L1-RSRP corresponding to the CRI.

However, the NR of previous studies can perform the beam selection based only on L1-RSRP. It is also unable to configure to add the interference report to the beam report.

In the example in FIG. 2, UE #1 is connected to transmission/reception point (TRP) #1, whereas UE #2 is connected to TRP #2. TRP #1 uses beam #1-4 based on RSRP measured by UE #1. TRP #2 uses beam #2-1 based on RSRP measured by UE #2. Beam #2-1 is a best beam for UE #2, but on the other hand, it interferes most with UE #1.

In this manner, in the case of the beam selection and reporting based only on L1-RSRP, the beam selection using only RSRP may cause interference, and this may cause occurrence of problems such as reduction in communication throughput.

In the light of this, the inventors of the present invention came up with the idea of CSI reporting configuration for appropriate beam selection and beam reporting.

Embodiments according to the present disclosure will be described in detail below with reference to the drawings. The radio communication methods relating to the embodiments may be applied individually, or may be applied in combination.

In the present disclosure, the terms "TRP," "base station," "cell," "component carrier (CC)," "cell group," "network (NW)," and "gNB" may be interchangeably interpreted.

In the present disclosure, the terms "interference," "SINR," "SNR," "RSRQ," "other indices (indicators) relating to interference (for example, any indices (indicators) other than an L1-RSRP)," and "interference power" may be interchangeably interpreted.

In the present disclosure, the terms "L1-SINR" and "L3-SINR" may be interchangeably interpreted.

(Radio Communication Method)

A plurality of interference measurement resources (IMRs) for interference levels of difference cases may be configured to the UE. The UE may report some pieces of additional information in addition to an L1-SINR, to notify a NW of the interference supposition (situation) that is assumed for the reported L1-SINR. The NW performs scheduling by using such a report, whereby interference can be reduced.

Figure 3:
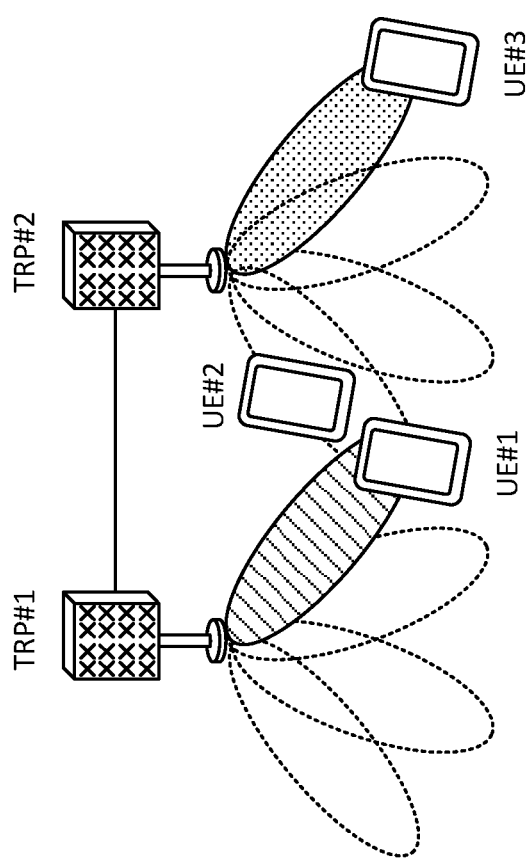
FIG. 3 is a diagram to show an example of beam selection based on SINRs.

In the example in FIG. 3, TRPs #1 and #2 may use the same cell or may use different cells. TRPs #1 and #2 may be connected by backhaul so as to perform scheduling in a coordinated manner.

UE #1 reports the best beam (for example, highest L1-RSRP), which is beam #2-4 that provides minimum interference (for example, highest L1-SINR). TRP #1 may perform scheduling that makes UE #1 use beam #1-1, based on the report. TRP #2 may perform scheduling that makes UE #3 use beam #2-4 in the period in which UE #1 is scheduled, the beam #2-4 being best for UE #3. TRP #2 may perform scheduling that makes UE #2 use beam #2-1 in a period other than the period in which UE #1 is scheduled, the beam #2-1 being best for UE #2.

The UE may report the top N numbers of L1-SINRs among the measured values of L1-SINR and the indices indicating resources corresponding thereto. The UE may measure L1-RSRPs (or values of signal power) and L1-SINRs by using the same SMR and may report L1-SINRs corresponding to the top N numbers of the measured values of L1-RSRP and the indices indicating resources corresponding thereto. The UE may also measure L1-RSRPs (or values of signal power) and L1-SINRs by using the same SMR and may report the L1-SINRs corresponding to the top N numbers of values based on L1-SINR and L1-RSRP (for example, values obtained from a calculation formula using the L1-SINR and the L1-RSRP, or sums obtained by weighting at least one of the L1-SINR and the L1-RSRP), and the indices indicating resources corresponding thereto.

At least one of an IMR for measuring interference between TRPs and an IMR for measuring interference between cells may be configured to the UE.

Embodiment 1

In the case where L1-SINR measurement based on signal measurement RS is configured, a signal measurement RS associated with one or more interference measurement resources (IMRs) for measuring interference, may be configured to the UE. The signal measurement RS may be an SSB and/or a CSI-RS.

The signal measurement RS may be referred to as a "signal measurement resource (SMR) (signal power measurement resource, signal strength measurement resource)." The SMR index (RS index, ID) for identifying an SMR may be an SSB index and/or a CSI-RS index.

The IMR may be a zero power (ZP) CSI-RS resource, a non-zero power (NZP) CSI-RS resource, and/or an SSB resource. The IMR index (ID) for identifying an IMR may be a CSI-RS index (CRI), a ZP CSI-RS index, an NZP CSI-RS index, and/or an SSB index (SSBRI).

Reporting only L1-RSRP, only L1-SINR, or both of L1-RSRP and L1-SINR, by the UE, may be configured by higher layer (for example, RRC) signaling or may be defined by specifications.

The UE may report an SMR index (for example, SSB index or CSI-RS index) and at least one of an L1-RSRP and an L1-SINR.

The necessity for the UE to report an IMR index in beam reporting based on L1-SINR may be configured by higher layer signaling or may be defined by specifications. The UE may report the IMR index in addition to the L1-SINR. In the case where a plurality of IMRs are configured and an L1-SINR is to be reported, the UE may report the IMR index each time. In the case where a plurality of IMRs are configured, reporting of an IMR index is configured, and an L1-SINR is to be reported, the UE may report the IMR index each time. In the case where a plurality of IMRs are configured, but reporting of an IMR index is not configured, and an L1-SINR is to be reported, the UE may not report the IMR index each time. In the case where one IMR is configured and an L1-SINR is to be reported, the UE may not report the IMR index. In the case of reporting an L1-SINR, the UE may report the IMR index each time. This makes the payload for reporting measurement of UCI constant and suppresses processing load.

The UE may measure a plurality of L1-RSRPs based on one or more SMRs, select one or more L1-RSRPs among the plurality of L1-RSRPs, and report the selected L1-RSRP and the SMR index used in measuring the selected L1-RSRP.

The UE may measure a plurality of L1-SINRs based on one or more SMRs and based on a plurality of IMRs, select one or more L1-SINRs among the plurality of L1-SINRs, and report the selected L1-SINR and the IMR index used in measuring the selected L1-SINR.

The UE may determine the measurement result and the index (at least one of an SMR index and an IMR index) to be reported, based on the measurement result of at least one of an L1-RSRP and an L1-SINR. Determining the measurement result and the index to be reported, based on only L1-RSRP, only L1-SINR, or both of L1-RSRP and L1-SINR, by the UE, may be configured by higher layer signaling or may be defined by specifications.

In the case where reporting N numbers of L1-RSRPs is configured, the UE may report, among a plurality of measurement results of L1-RSRP, the top N numbers of L1-RSRPs and the indices of SMRs used in measuring the top N numbers of L1-RSRPs. In the case where reporting N numbers of L1-SINRs is configured, the UE may report, among a plurality of measurement results of L1-SINR, the top N numbers of L1-SINRs and the indices of IMRs used in measuring the top N numbers of L1-SINRs.

CONCRETE EXAMPLES

In the examples in FIGS. 4A to 4D, TRP #1 has four beams #1-1, #1-2, #1-3, and #1-4, and TRP #2 has four beams #2-1, #2-2, #2-3, and #2-4. The UE is connected to TRP #1. One SMR #1 that is associated with four IMRs is configured to the UE. The SMR corresponds to beam #1-1. IMRs #1 to #4 correspond to beams #2-1, #2-2, #2-3, and #2-4, respectively.

Figure 4A:
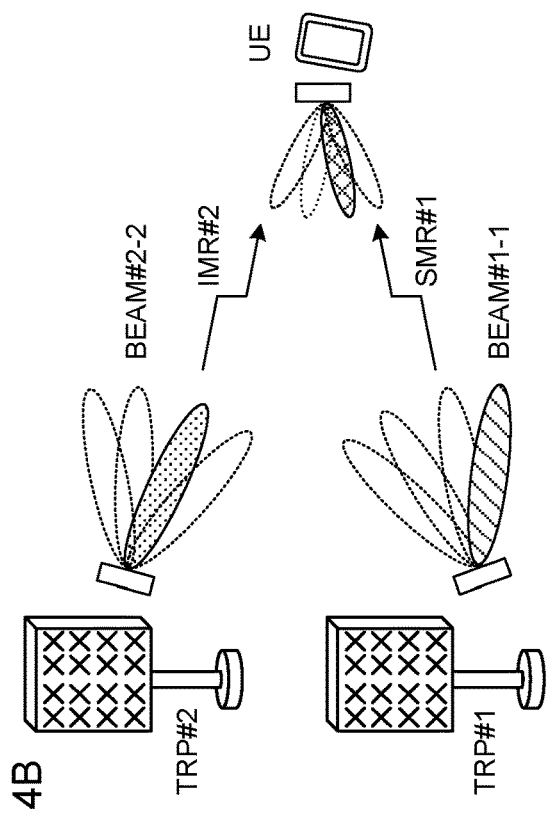
FIGS. 4A to 4D are diagrams to show examples of L1-SINR reporting according to Embodiment 1.
Figure 4B:
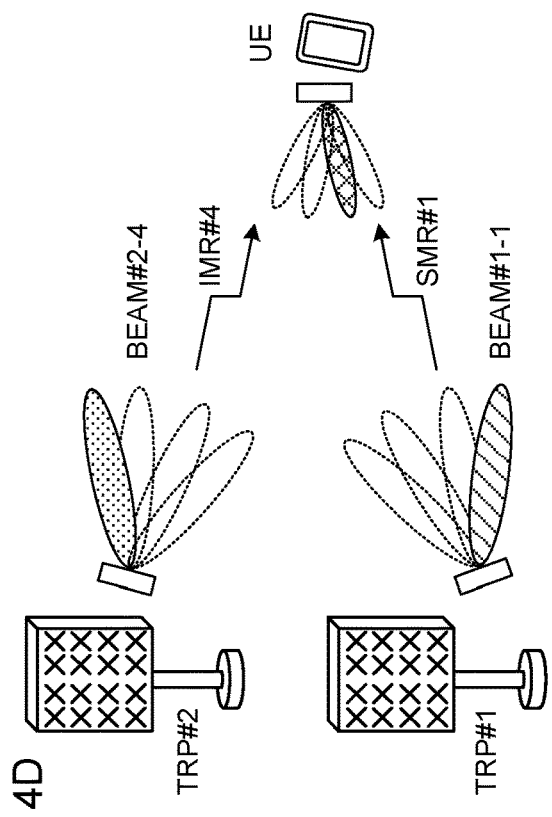
Figure 4C:
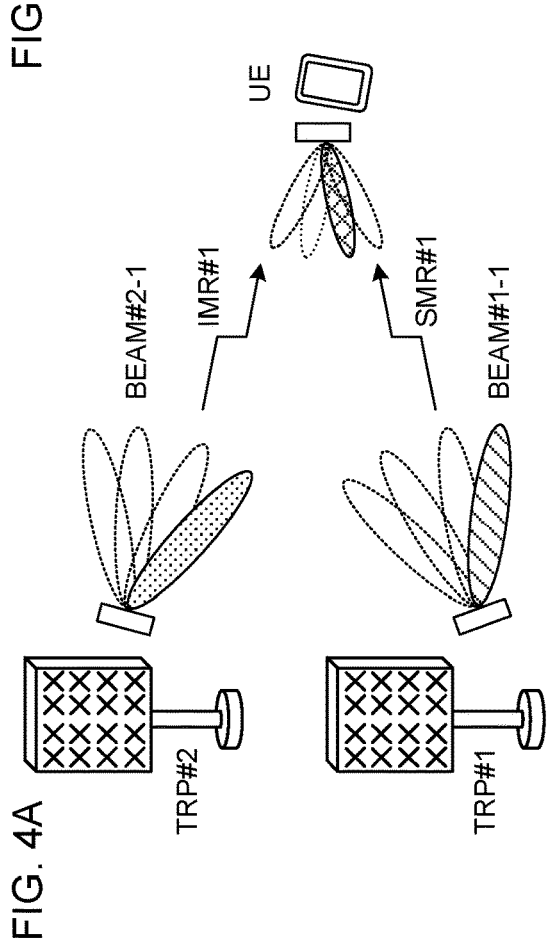
Figure 4D:
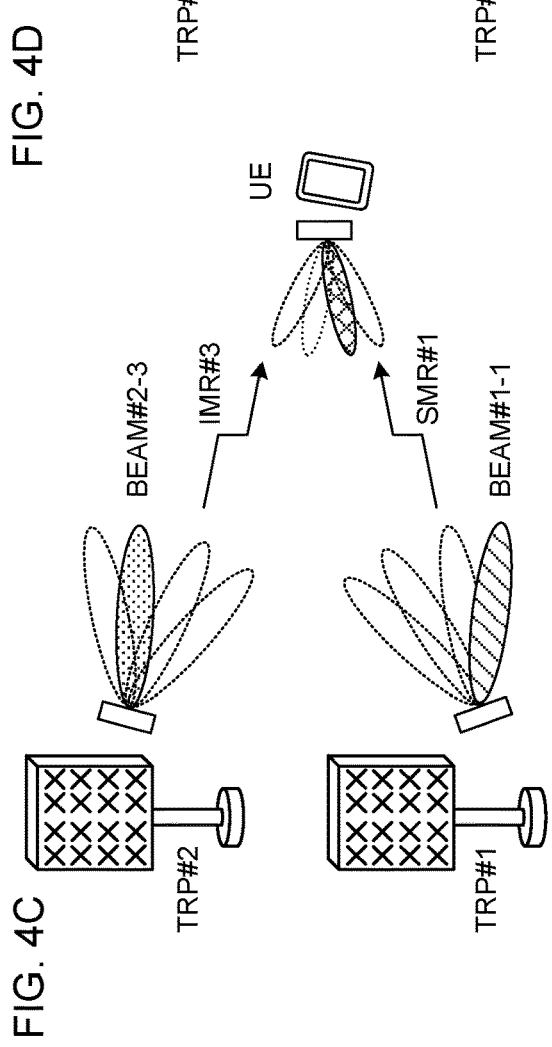

In the example in FIG. 4A, the UE measures an L1-SINR by using SMR #1 and IMR #1. In this case, the measured L1-SINR is $S_{1-1}/(I_{2-1}+I_{other})$. Here, $S_{1-1}$ represents received power corresponding to beam #1-1, $I_{2-1}$ represents received power corresponding to beam #2-1, and $I_{other}$ represents received power corresponding to other interference. In the example in FIG. 4B, the UE measures an L1-SINR by using SMR #1 and IMR #2. In this case, the measured L1-SINR is $S_{1-1}/(I_{2-2}+I_{other})$. Here, $I_{2-2}$ represents received power corresponding to beam #2-2, and $I_{other}$ represents received power corresponding to other interference. In the example in FIG. 4C, the UE measures an L1-SINR by using SMR #1 and IMR #3. In this case, the measured L1-SINR is $S_{1-1}/(I_{2-3}+I_{other})$. Here, $I_{2-3}$ represents received power corresponding to beam #2-3, and $I_{other}$ represents received power corresponding to other interference. In the example in FIG. 4D, the UE measures an L1-SINR by using SMR #1 and IMR #4. In this case, the measured L1-SINR is $S_{1-1}/(I_{2-4}+I_{other})$. Here, $I_{2-4}$ represents received power corresponding to beam #2-4, and $I_{other}$ represents received power corresponding to other interference.

Such configuration allows the UE to measure four L1-SINRs (L1-SINRs in which the number corresponds to the number of the IMRs).

In the case of reporting the top two L1-SINRs (for example, beam #2-3 and #2-4), the UE may report these L1-SINRs and corresponding IMR indices (for example, IMR indices #3 and #4). Note that the top two of L1-SINRs may be selected by the following selection methods. The top two of L1-SINRs having highest values may be selected among the measured values of L1-SINRs. The top two of L1-SINRs having highest values of L1-RSRP (or values of signal power) may be selected among the measured values of L1-SINR. Two L1-SINRs may be selected by using both of the values of L1-SINR and L1-RSRP (or signal power), among the measured values of L1-SINR.

The NW performs beam selection and scheduling by using the L1-SINR and the IMR index, whereby interference can be reduced.

<<Report Quantity Information>>

The report quantity (for example, reportQuantity) that is configured by an RRC information element (IE) may contain an IMR index.

This report quantity may be an extension of an existing RRC parameter "reportQuantity" or may be represented by a new RRC parameter. The new RRC parameter may be contained in CSI report configuration information (CSI-ReportConfig) and be notified to the UE.

FIG. 5 is a diagram to show examples of report quantities for reporting at least one of SINRs and IMR indices. These report quantities are extensions of existing RRC parameters "reportQuantity."

For example, any one of the followings may be designated as a target of reporting, by using the report quantity:

SMR index, RSRP (for example, configured by cri-RSRP or ssb-Index-RSRP),

SMR index, SINR (for example, configured by cri-SINR or ssb-Index-SINR),

SMR index, RSRP, SINR (for example, configured by cri-RSRP-SINR or ssb-Index-RSRP-SINR), SMR index, IMR index, SINR (for example, configured by cri-imr-Index-SINR or ssb-Index-imr-Index-SINR), SMR index, IMR index, RSRP, SINR (for example, configured by cri-imr-Index-imr-Index-RSRP-SINR or ssb-Index-imr-Index-RSRP-SINR), and IMR index (for example, configured by imr-Index).

Each of the SMR index and the IMR index may be a CRI or an SSBRI. The imr-Index may be interpreted as an "imri," an "imi," and so on.

For example, in the case where "ssb-Index-RSRP-SINR-imr-Index" is configured as a report quantity, the UE may report RSRP, the SSBRI used for the RSRP, an SINR, and the IMR index used for the SINR.

Note that the UE may add, in a report containing a measurement result starting from "csi-," the CRI corresponding to the measurement result. Note that the UE may add, in a report containing a measurement result starting from "ssb-," the SSBRI corresponding to the measurement result.

In the present disclosure, the name starting from "cri-," such as "cri-RSRP-SINR," may be interpreted as the name starting from "csi-," such as "cri-RSRQ," and "cri-RSRP-SINR."

FIG. 6 is a diagram to show other examples of report quantities for reporting at least one of SINRs and IMR indices. These report quantities are configured by new RRC parameters "reportQuantity-r16." The target of reporting that can be designated may be similar to that described in FIG. 5.

This parameter may be notified to a UE being in conformity with, for example, Rel-16 NR (Rel-16 UE). The UE may ignore "reportQuantity" in the case where "reportQuantity-r16" is configured. A UE being in conformity with Rel-15 NR (Rel-15 UE) may be notified of an existing RRC parameter "reportQuantity." Rel-15 UE may ignore configuration of "reportQuantity-r16." This enables achieving backward compatibility of specifications. Note that, instead of Rel-16, a later release number may be used.

In the case where a report quantity is configured for reporting at least one of an SINR and an IMR index, the UE may assume at least one of the following operations:

Perform low latency beam selection (or measurement or reporting),

Perform low overhead beam selection (or measurement or reporting),

Perform beam failure recovery in a secondary cell,

Use interference measurement result (for example, RSRQ or SINR) in beam failure recovery, Use interference measurement result (for example, RSRQ or SINR) in beam selection, and Add interference measurement result (for example, RSRQ or SINR) in a beam report.

Note that low latency beam selection may be referred to as "fast beam selection," "beam selection without TCI state (beam selection w/o TCI state)," "beam selection type II," "TCI state indication type 2," and so on.

The low overhead beam selection may be a scheme of, for example, skipping reporting of the beam report under a certain condition.

Note that the UE may transmit to a base station, UE capability information relating to a possibility of reporting at least one of an SINR and an IMR index. The base station may configure report quantities including at least one of an SINR and an IMR index, to the UE that has the UE capability information.

The UE, in which more than one numbers of RS resources to be reported are configured by a higher layer parameter (for example, an RRC parameter "nrofReportedRS") contained in the CSI reporting configuration information, may report an L1-RSRP or an L1-SINR corresponding to a certain RS, in the form of the difference from the maximum L1-RSRP or L1-SINR.

The above-described Embodiment 1 enables the UE to reduce overhead in reporting an L1-SINR. The NW can recognize the IMR that is used in measuring the reported L1-SINR.

Embodiment 2

In the case where L1-SINR measurement based on SMR is configured, an index of combination of the SMR and the IMR (combination index, ID) may be configured to the UE. One or more combinations (combination indices) for measuring an L1-SINR may be configured to the UE.

Associations between the combination index, the SMR, and the IMR (for example, table) may be configured to the UE by higher layer signaling or may be defined by specifications.

The combination of the SMR and the IMR may be referred to as a "CSI process." The combination index may be referred to as a "CSI process index."

In the case where reporting of L1-SINR is configured, the UE may report the L1-SINR and the combination index used in measuring the L1-SINR. In this case, the UE may not report at least one of the SMR index and the IMR index. In the case where a combination index is configured, the UE may not report the SMR index, although L1-RSRP reporting is configured.

Reporting the combination index by the UE reduces overhead of reporting.

The UE may measure a plurality of L1-RSRPs based on one or more SMRs, select one or more L1-RSRPs among the plurality of L1-RSRPs, and report the selected L1-RSRP and the combination index used in measuring the selected L1-RSRP.

The UE may measure a plurality of L1-SINRs based on a plurality of combinations, select one or more L1-SINRs among the plurality of L1-SINRs, and report the selected L1-SINR and the combination index used in measuring the selected L1-SINR.

The UE may determine the measurement result and the index (combination index) to be reported, based on the measurement result of at least one of an L1-RSRP and an L1-SINR. Determining the measurement result and the index to be reported, based on only L1-RSRP, only L1-SINR, or both of L1-RSRP and L1-SINR, by the UE, may be configured by higher layer signaling or may be defined by specifications.

In the case where reporting N numbers of L1-RSRPs is configured, the UE may report, among a plurality of measurement results of L1-RSRP, the top N numbers of L1-RSRPs and the combination indices of resources used in measuring the top N numbers of L1-RSRPs. In the case where reporting N numbers of L1-SINRs is configured, the UE may report, among a plurality of measurement results of L1-SINR, the top N numbers of L1-SINRs and the combination indices of resources used in measuring the top N numbers of L1-SINRs.

The IMR index (imr-Index) in the report quantity information in Embodiment 1 may be interpreted as the "combination index."

CONCRETE EXAMPLES

In the examples in FIGS. 7A to 7D, TRP #1 has four beams #1-1, #1-2, #1-3, and #1-4, and TRP #2 has four beams #2-1, #2-2, #2-3, and #2-4. The UE is connected to TRP #1. Four combinations #1 to #4 of SMRs and IMRs are configured to the UE.

Figure 7A:
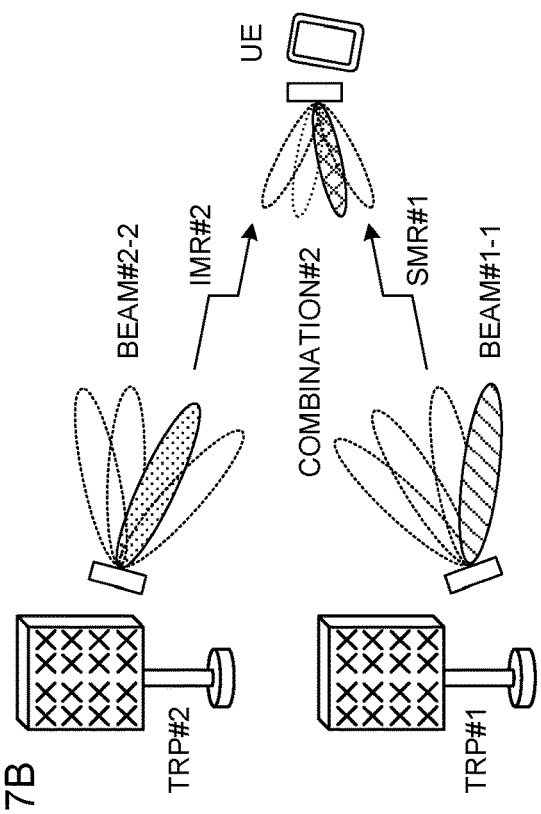
FIGS. 7A to 7D are diagrams to show examples of L1-SINR reporting according to Embodiment 2.
Figure 7B:
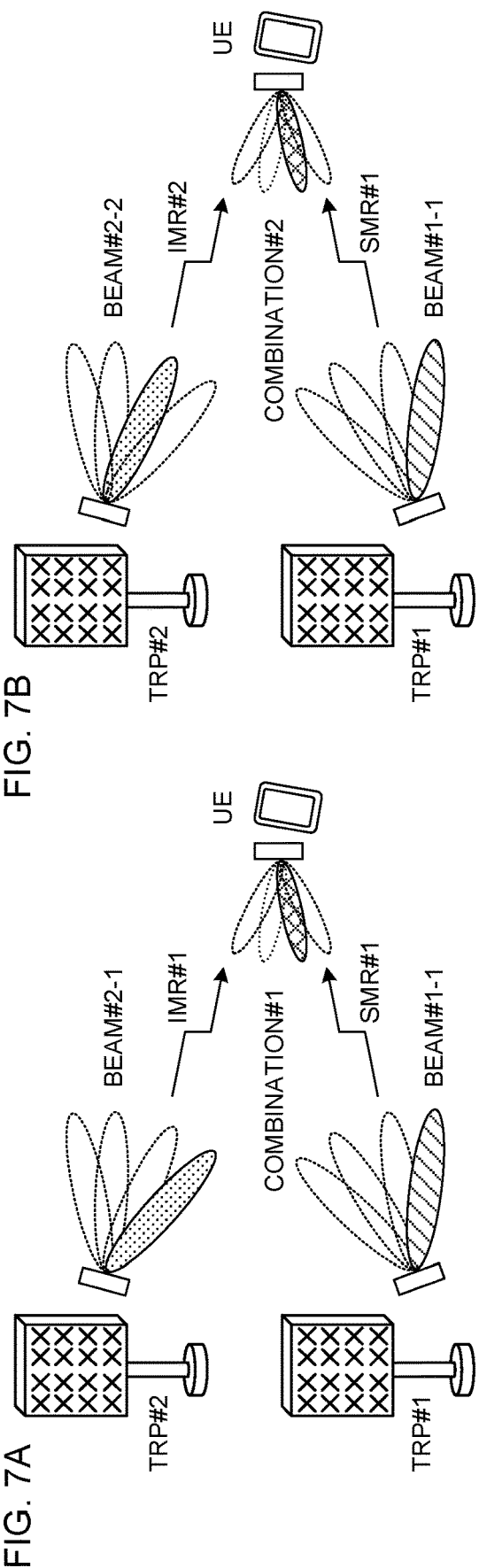
Figure 7C:
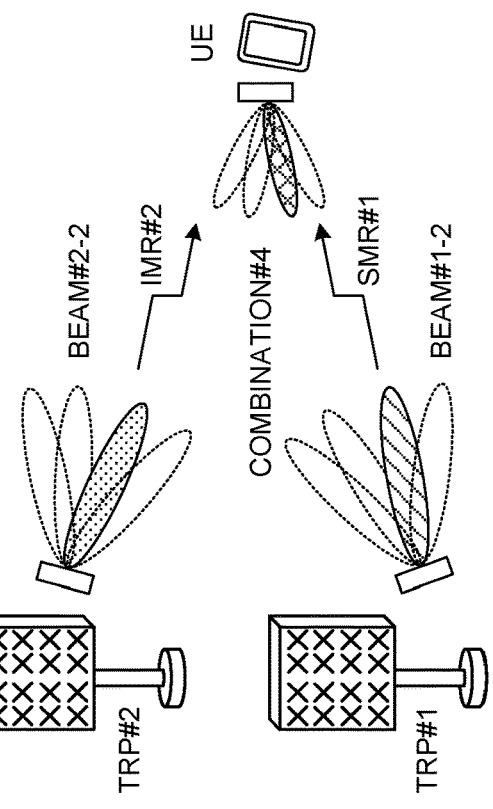
Figure 7D:
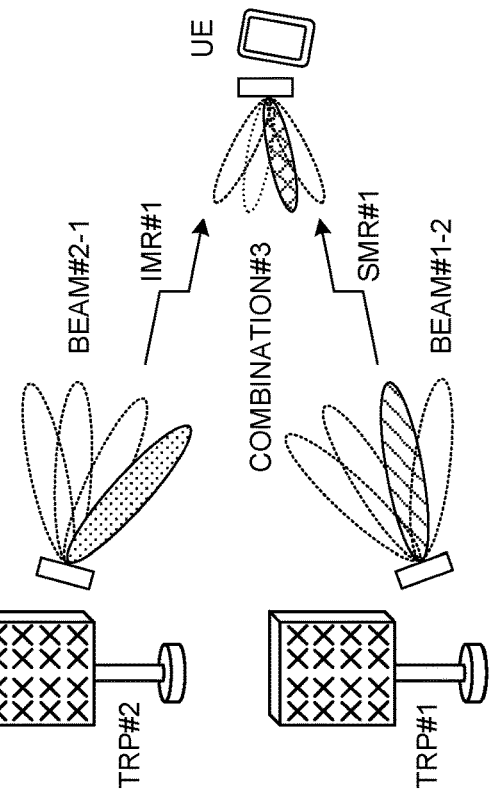

In the example in FIG. 7A, the UE measures an L1-SINR by using the combination #1. The combination #1 is associated with SMR #1 (beam #1-1) and IMR #1 (beam #2-1). In this case, the measured L1-SINR is $S_{1-1}/(I_{2-1}+I_{other})$. Here, $S_{1-1}$ represents received power corresponding to beam #1-1, $I_{2-1}$ represents received power corresponding to beam #2-1, and $I_{other}$ represents received power corresponding to other interference. In the example in FIG. 7B, the UE measures an L1-SINR by using the combination #2. The combination #2 is associated with SMR #1 (beam #1-1) and IMR #2 (beam #2-2). In this case, the measured L1-SINR is $S_{1-1}/(I_{2-2}+I_{other})$. Here, $I_{2-2}$ represents received power corresponding to beam #2-2, and $I_{other}$ represents received power corresponding to other interference. In the example in FIG. 7C, the UE measures an L1-SINR by using the combination #3. The combination #3 is associated with SMR #2 (beam #1-2) and IMR #1 (beam #2-1). In this case, the measured L1-SINR is $S_{1-2}/(I_{2-1}+I_{other})$. In the example in FIG. 7D, the UE measures an L1-SINR by using the combination #4. The combination #4 is associated with SMR #2 (beam #1-2) and IMR #2 (beam #2-2). In this case, the measured L1-SINR is $S_{1-2}/(I_{2-2}+I_{other})$.

Such configuration allows the UE to measure four L1-SINRs (L1-SINRs in which the number corresponds to the number of the combinations).

The above-described Embodiment 2 enables the UE to reduce overhead in reporting an L1-SINR. The NW can recognize the IMR that is used in measuring the reported L1-SINR.

Embodiment 3

L1-SINR reporting (measurement) resources including an SMR and an IMR may be configured to the UE. The L1-SINR reporting resource may be interpreted as an "SMR" and an "IMR."

The L1-SINR reporting (measuring) resource may be identified by an L1-SINR reporting index (ID, entity).

Associations between the L1-SINR reporting resource, the SMR, and the IMR (for example, table) may be configured to the UE by higher layer signaling or may be defined by specifications.

The UE may measure a plurality of L1-RSRPs based on one or more SMRs, select one or more L1-RSRPs among the plurality of L1-RSRPs, and report the selected L1-RSRP and the SMR index used in measuring the selected L1-RSRP.

The UE may measure a plurality of L1-SINRs based on a plurality of L1-RSRPs reporting resources, select one or more L1-SINRs among the plurality of L1-SINRs, and report the selected L1-SINR and the L1-SINR reporting index used in measuring the selected L1-SINR.

The UE may determine the measurement result and the index (L1-SINR reporting index) to be reported, based on the measurement result of at least one of an L1-RSRP and an L1-SINR. Determining the measurement result and the index to be reported, based on only L1-RSRP, only L1-SINR, or both of L1-RSRP and L1-SINR, by the UE, may be configured by higher layer signaling or may be defined by specifications.

In the case where reporting N numbers of L1-RSRPs is configured, the UE may report, among a plurality of measurement results of L1-RSRP, the top N numbers of L1-RSRPs and the L1-SINR reporting indices of resources used in measuring the top N numbers of L1-RSRPs. In the case where reporting N numbers of L1-SINRs is configured, the UE may report, among a plurality of measurement results of L1-SINR, the top N numbers of L1-SINRs and the L1-SINR reporting indices of resources used in measuring the top N numbers of L1-SINRs.

The IMR index (imr-Index) in the report quantity information in Embodiment 1 may be interpreted as the "L1-SINR reporting index."

CONCRETE EXAMPLES

In the examples in FIGS. 8A to 8D, TRP #1 has four beams #1-1, #1-2, #1-3, and #1-4, and TRP #2 has four beams #2-1, #2-2, #2-3, and #2-4. Four L1-SINR reporting resources #1 to #4 are configured to the UE.

Figure 8A:
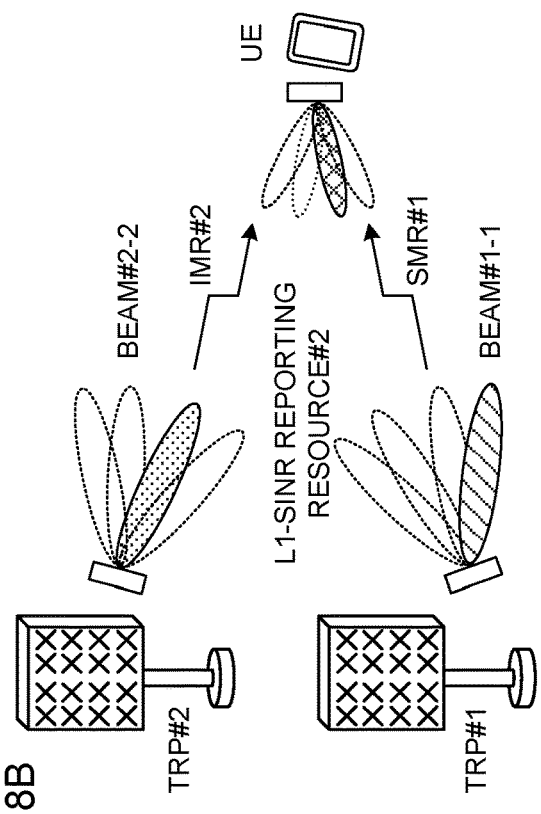
FIGS. 8A to 8D are diagrams to show examples of L1-SINR reporting according to Embodiment 3.
Figure 8B:
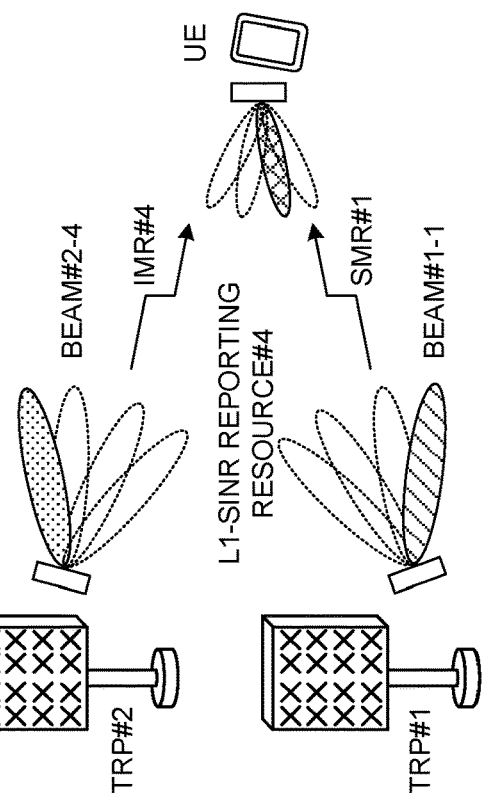
Figure 8C:
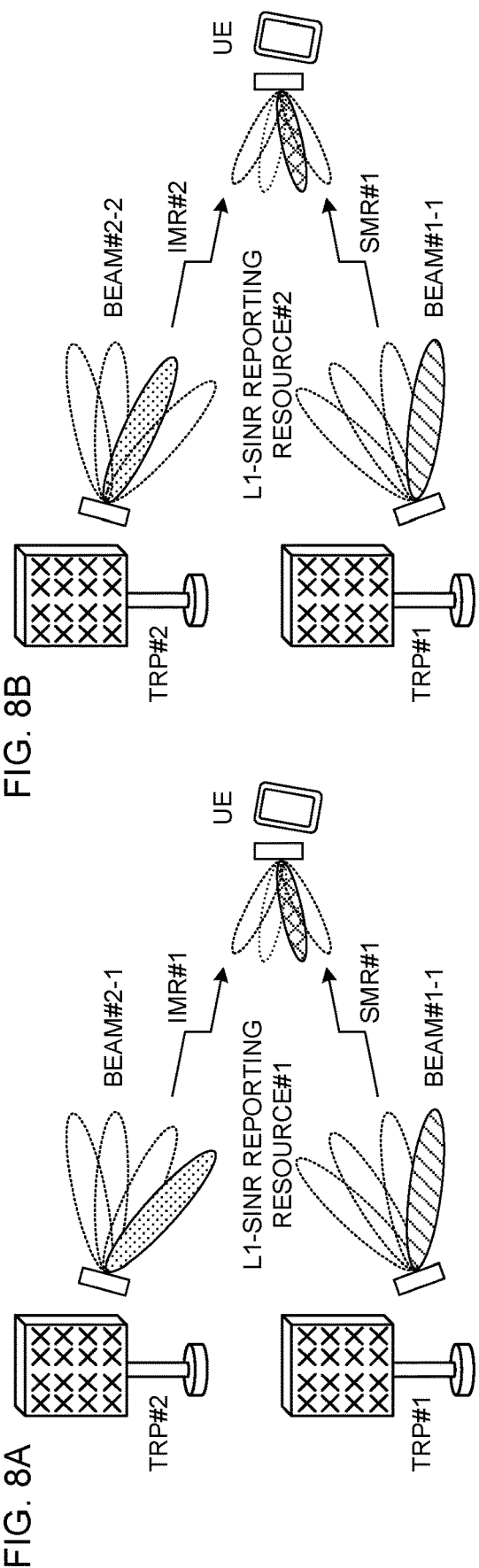
Figure 8D:
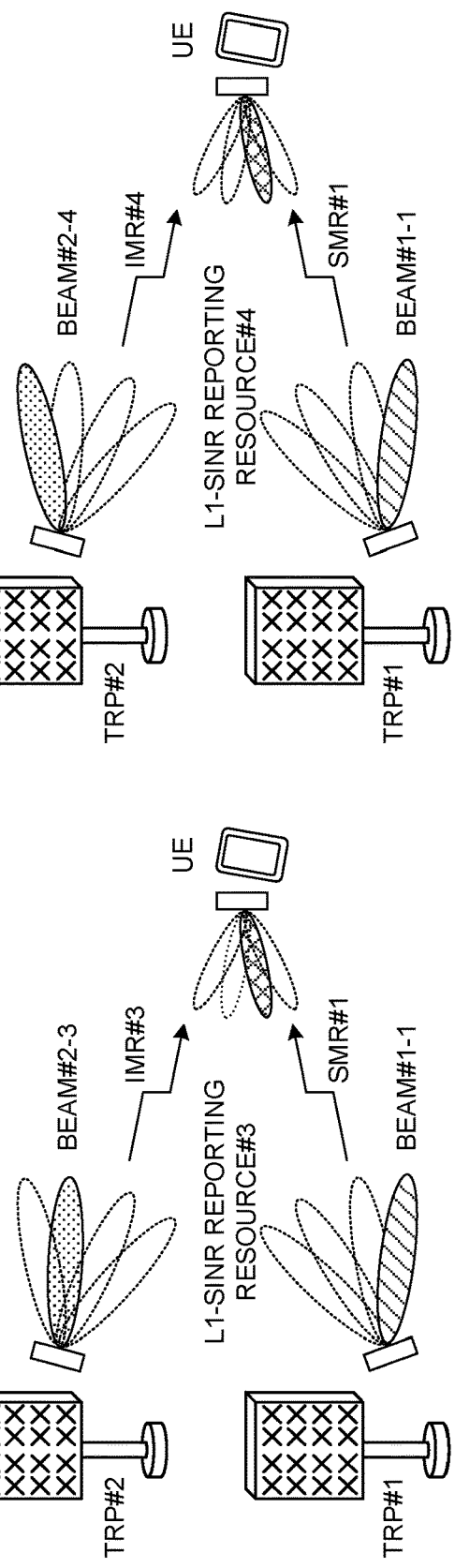

In the example in FIG. 8A, the UE may measure an L1-SINR by using L1-SINR reporting resource #1. L1-SINR reporting resource #1 is associated with SMR #1 and IMR #1. In the example in FIG. 8B, the UE measures an L1-SINR by using L1-SINR reporting resource #2. L1-SINR reporting resource #2 is associated with SMR #1 and IMR #2. In the example in FIG. 8C, the UE measures an L1-SINR by using L1-SINR reporting resource #3. L1-SINR reporting resource #3 is associated with SMR #1 and IMR #3. In the example in FIG. 8D, the UE measures an L1-SINR by using L1-SINR reporting resource #4. L1-SINR reporting resource #4 is associated with SMR #1 and IMR #4.

For example, the UE reports "3" of the L1-SINR reporting index and "m dB" of the L1-SINR, whereby the NW recognizes that the L1-SINR based on reference power $I_{2-3}$ measured by using IMR #3, has been reported.

In the examples in FIGS. 7A to 7D, the combination may be interpreted as the "L1-SINR reporting resource," and the combination index may be interpreted as "L1-SINR reporting index."

The above-described Embodiment 3 enables the UE to reduce overhead in reporting an L1-SINR. The NW can recognize the IMR that is used in measuring the reported L1-SINR.

Embodiment 4

The UE may report UE capability information relating to L1-SINR reporting.

The UE capability information may contain the value of the numbers of L1-SINRs to be reported (for example, the maximum number of L1-SINRs to be reported). The UE may not assume reporting L1-SINRs in the number more than the value (may not expect that reporting L1-SINRs in the number more than the value is configured).

The UE capability information may contain the value of the numbers of SMRs (such as indices of at least one of an SSB and a CSI-RS) to be reported (for example, the maximum number of SMRs to be reported). The UE may not assume measuring L1-SINRs by using SMRs in the number more than the value (may not expect that measuring or reporting using SMRs in the number more than the value is configured).

The UE capability information may contain the value of the numbers of IMRs (such as indices of at least one of a ZP-CSI-RS resource, an NZP-CSI-RS resource, and an SSB resource) to be reported (for example, the maximum number of IMRs to be reported). The UE may not assume measuring L1-SINRs by using IMRs in the number more than the value (may not expect that measuring or reporting using IMRs in the number more than the value is configured).

In the case where the UE reports at least one value of an L1-RSRP, an L1-SINR, an SMR index, an IMR index, a combination index, and an L1-SINR reporting index, the number of the values to be reported may be configured by higher layer signaling or may be defined by specifications.

The above-described Embodiment 4 enables appropriately configuring the L1-SINR reporting to the UE, depending on the capability.

<Use Cases>

Each of the above-described embodiments makes it possible to implement at least one of the following Use Cases 1 and 2.

<<Use Case 1>>

In the case where two TRPs transmit to one UE in a coordinated manner, or two TRPs transmit to different UEs, the two TRPs may perform scheduling in a coordinated manner.

Group-based beam reporting may be configured to a UE that has a capability of simultaneously receiving different beams from the two TRPs. The UE may report a beam pair to the two TRPs. The NW can use the reported beam pair in scheduling.

A UE that does not have the capability of simultaneously receiving different beams from the two TRPs may be scheduled by one TRP. In a situation where a serving TRP is TRP #1 (UE #1 is connected to TRP #1), and UE #1 is located at a cell edge between the two TRPs, in order to reduce the possibility of interference from TRP #2, TRP #2 preferably knows which beam from TRP #2 interferes less with the UE.

Figure 9:
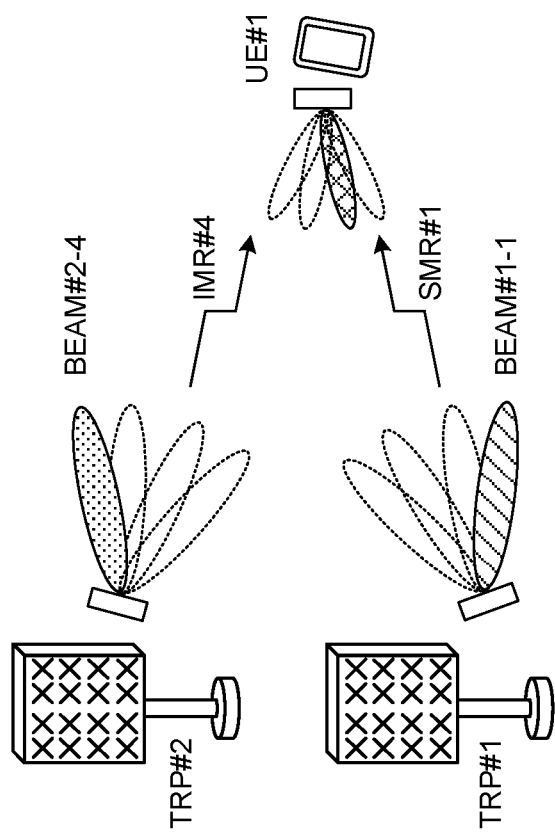
FIG. 9 is a diagram to show an example of Use Case 1.

In the example in FIG. 9, TRP #1 configures four IMRs #1 to #4 to UE #1. IMRs #1 to #4 correspond to beams #2-1 to #2-4 from TRP #2, respectively.

UE #1 may report the best beam among beams #1-1 to #1-4. TRP #1 may select the beam for UE #1, based on the report. UE #1 may report the beam that provides the least interference among beams #2-1 to #2-4. UE #1 determines that beam #2-4 of TRP #2 provides the least interference (highest L1-SINR) and reports "4" of the IMR index in addition to the L1-SINR based on IMR #4.

Two TRPs #1 and #2 perform coordinated scheduling based on the report from UE #1. Thus, TRP #1 performs scheduling that makes UE #1 use beam #1-2, and, in the period in which UE #1 is scheduled, TRP #2 selects beam #2-4 in order to reduce interference with UE #1 and performs scheduling that makes UE #2 use beam #2-4.

In this manner, reporting the IMR corresponding to the L1-SINR by the UE can reduce interference between the TRPs.

<<Use Case 2>>

One TRP may simultaneously use a plurality of beams by using a plurality of panels. For example, TRP #1 uses panel #1 for one UE #1 and uses panel #2 for another UE #2.

This makes it more easy to implement operation similar to multi-user (MU)-multi-input multi-output (MIMO) in frequency range (FR) 2.

Figure 10:
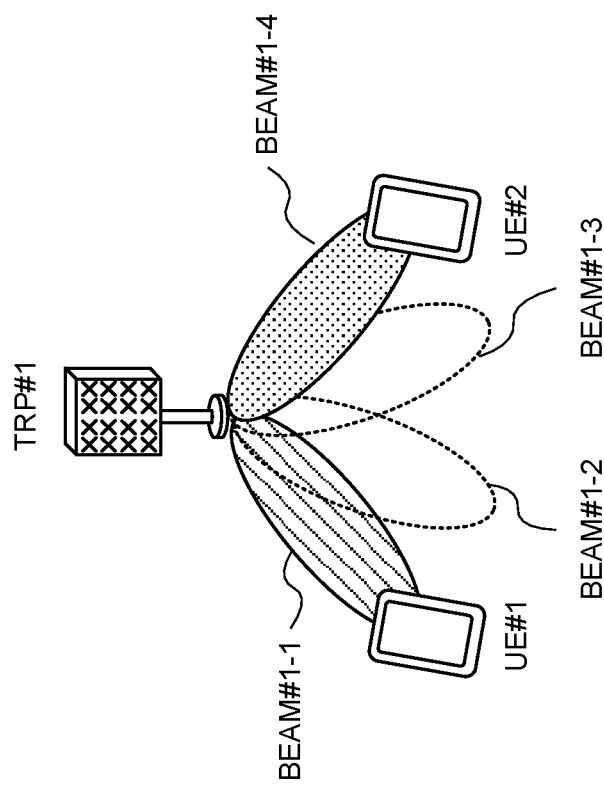
FIG. 10 is a diagram to show an example of Use Case 2.

In the example in FIG. 10, TRP #1 configures four IMRs #1 to #4 to UEs #1 and #2. IMRs #1 to #4 correspond to beams #1-1 to #1-4, respectively.

UEs #1 and #2 may report the best beam (for example, best beam based on at least one of an L1-RSRP and an L1-SINR) among beams #1-1 to #1-4. TRP #1 may select the beam for the UE, based on the report. UEs #1 and #2 may report the beam that provides the least interference among beams #1-1 to #1-4. The UE determines that beam #1-4 provides the least interference (highest L1-SINR) and reports "4" of the IMR index in addition to the L1-SINR based on IMR #4. Similarly, UE #2 may report "1" of the IMR index in addition to the L1-SINR based on IMR #1.

TRP #1 transmits a PDSCH to UE #1 by using panel #1 and TCI state #1 based on these reports and transmits a PDSCH to UE #2 by using panel #2 and TCI state #2 that are different therefrom in the same band (for example, physical resource block (PRB))

When TRP #1 performs beam selection based on the best RSRP (as in the case of Rel. 15), interference between the UEs is not considered.

In this manner, reporting the IMR corresponding to the L1-SINR by the UE can reduce interference between the UEs.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 11:
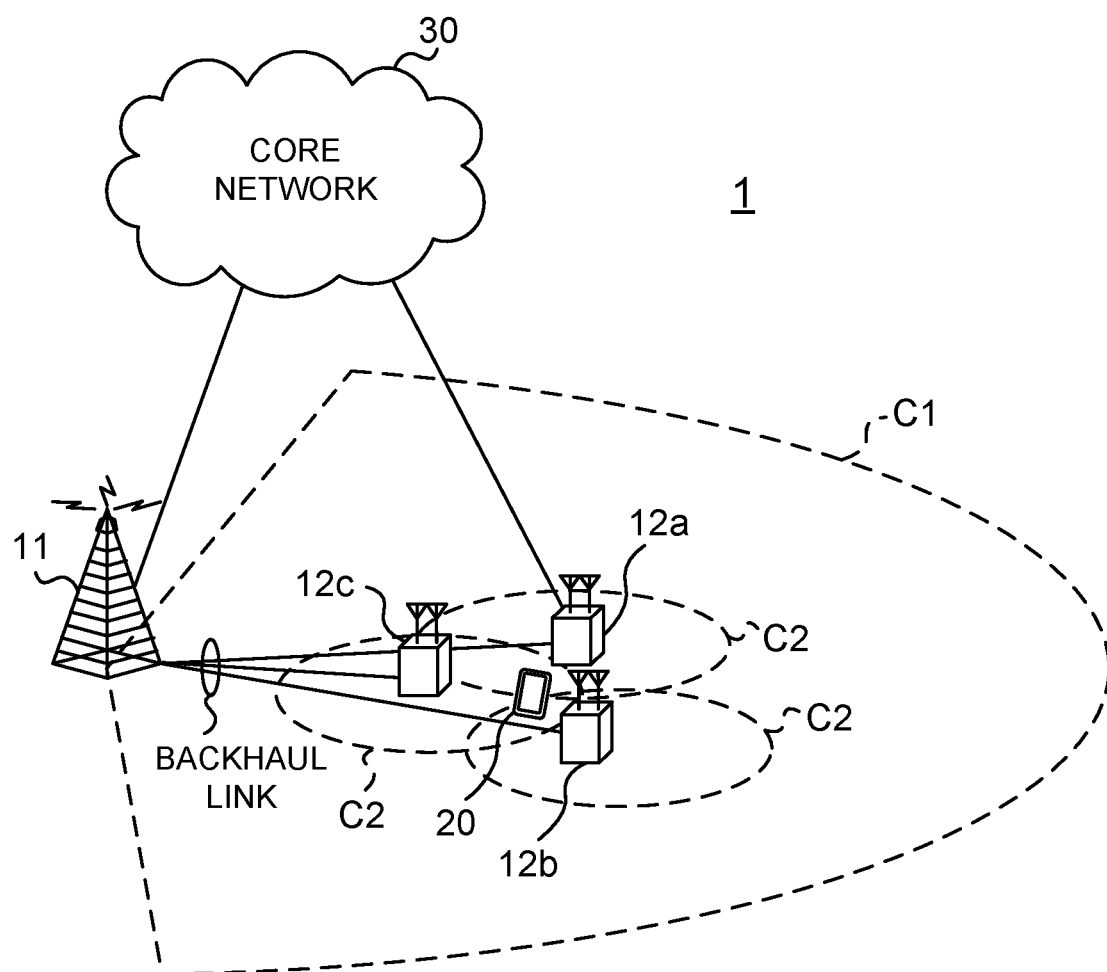
FIG. 11 is a diagram to show an example of a schematic structure of a radio communication system according to one embodiment.

FIG. 11 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CC) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDCCH may be interpreted as "DL data," and the PUSCH may be interpreted as "UL data."

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 12:
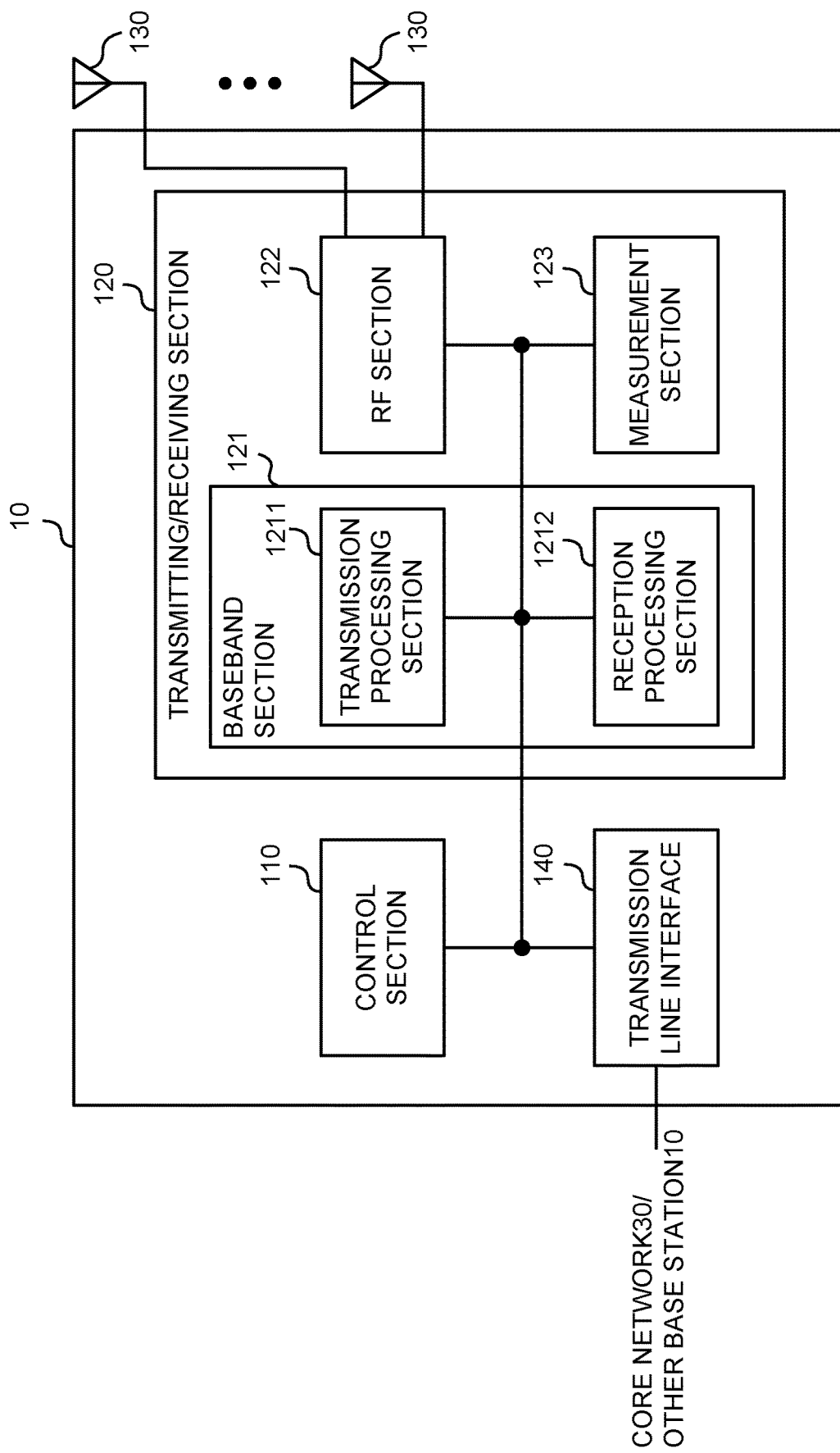
FIG. 12 is a diagram to show an example of a structure of a base station according to one embodiment.

FIG. 12 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-toanalog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120 and the transmitting/receiving antennas 130.

The control section 110 may use a plurality of transmission points in which the offset is a threshold or lower, and may perform communication (for example, multi-TRP transmission) using a plurality of resources respectively corresponding to the plurality of transmission points. At least some of the plurality of resources may overlap with each other. The control section 110 may determine a plurality of transmission points in which the offset is a threshold or lower, based on the offset reported from the UE.

The control section 110 may configure a guard area between a plurality of resources respectively corresponding to the plurality of transmission points, to the UE.

The control section 110 may perform communication (for example, multi-TRP transmission) using the plurality of transmission points, based on capability information reported from the UE.

(User Terminal)

Figure 13:
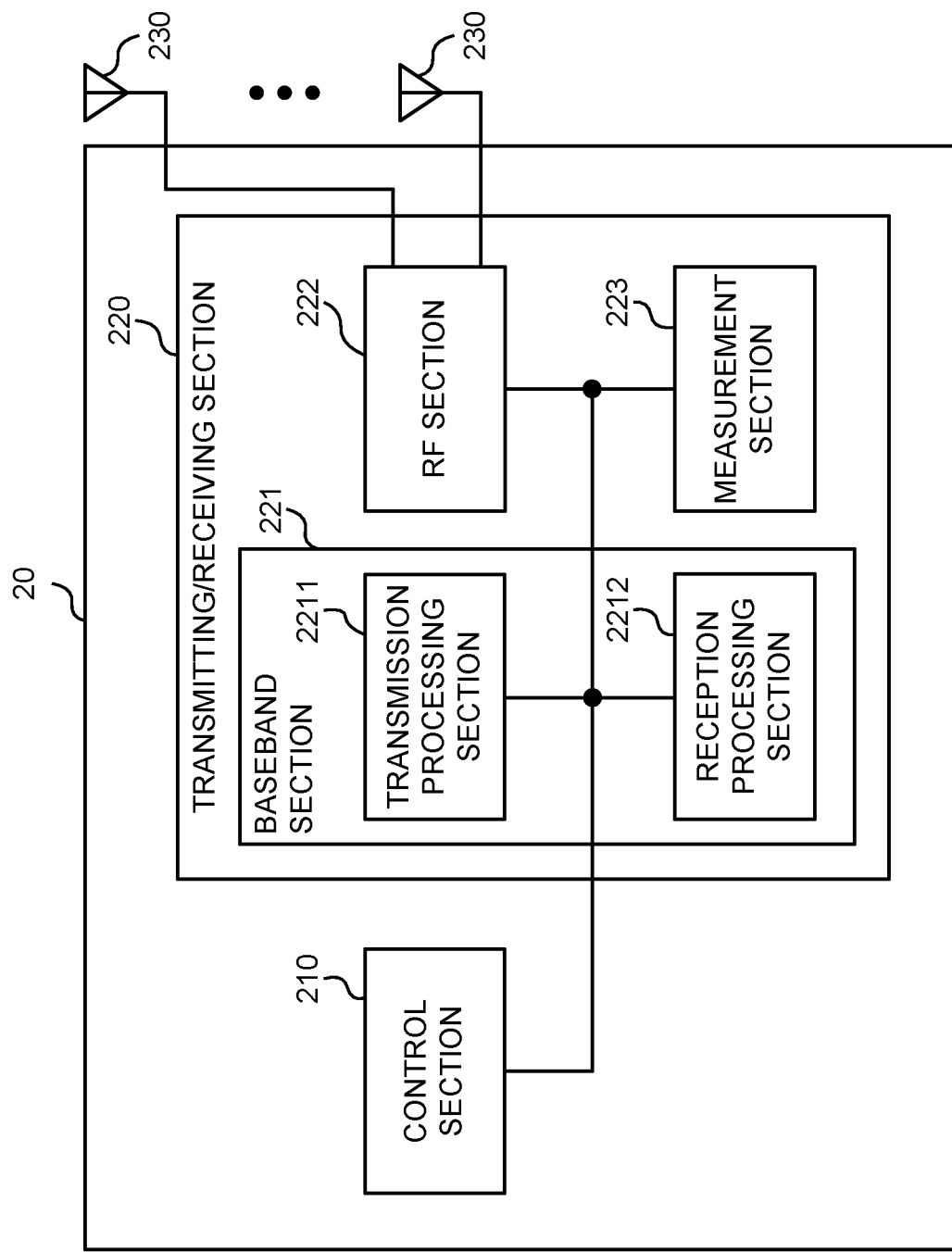
FIG. 13 is a diagram to show an example of a structure of a user terminal according to one embodiment.

FIG. 13 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

The control section 210 may measure a plurality of Signal to Interference plus Noise Ratios (SINRs) (for example, L1-SINRs), based on one or more signal measurement resources (such as SMRs) and a plurality of interference measurement resources (such as IMRs). The transmitting/receiving section 220 may report one or more SINRs among the plurality of the SINRs and one or more indices associated with the resources used for the one or more SINRs (for example, IMR indices, combination indices, or L1-SINR reporting indices).

The one or more indices may respectively correspond to one or more interference measurement resources (Embodiment 1).

Each of the one or more indices corresponds to a combination of one of the one or more signal measurement resources and one of the plurality of the interference measurement resources (for example, combinations or L1-SINR reporting resources) (Embodiments 2 and 3).

The control section 210 may determine the one or more indices, based only on Reference Signal Received Power (RSRP), only on an SINR, or on both of the RSRP and the SINR.

The control section 210 may be configured such that report quantity (for example, reportQuantity) contains the one or more SINRs and the one or more indices.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 14:
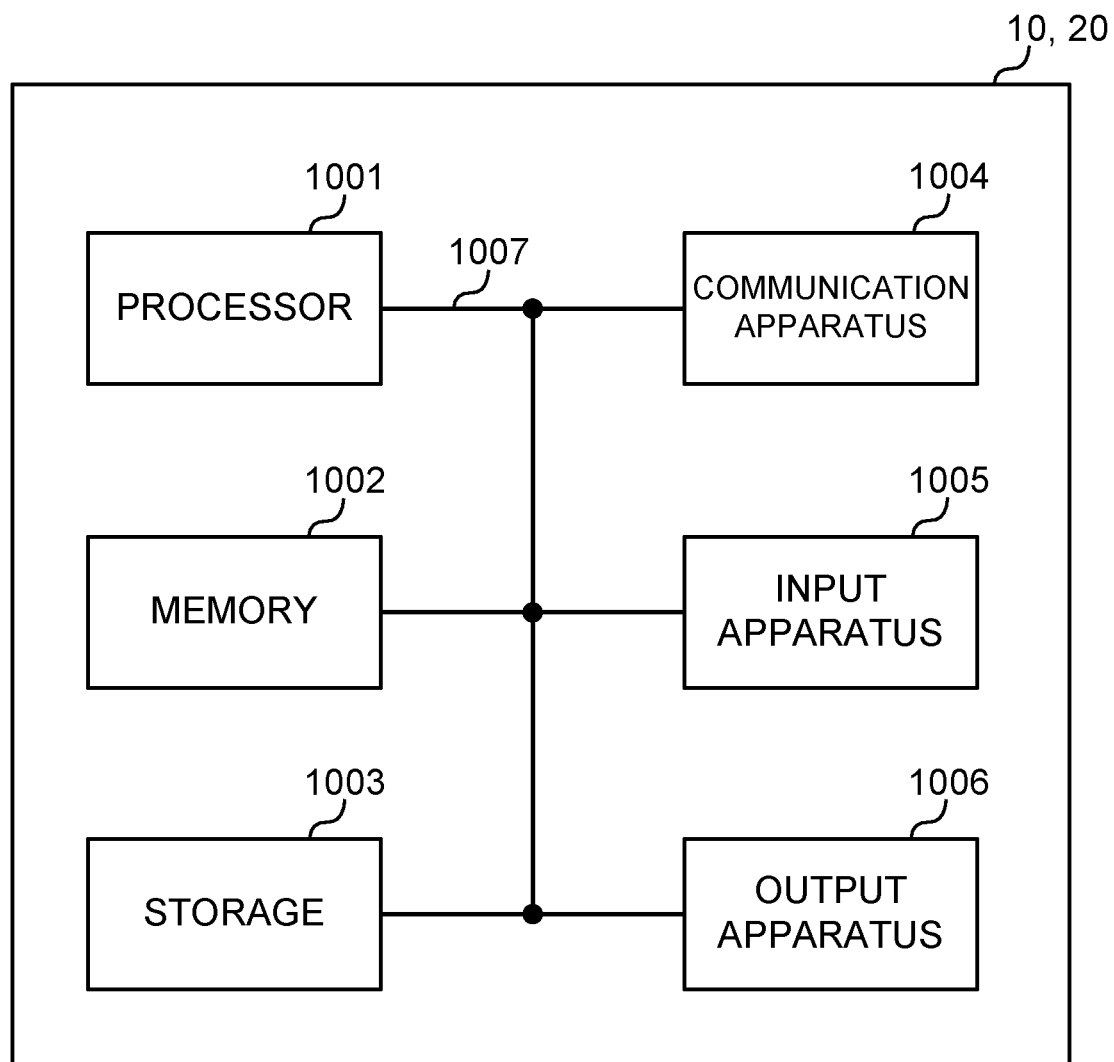
FIG. 14 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 14 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

VARIATIONS

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP."

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (M4B), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
   a processor that measures a plurality of indicators based on a plurality of channel measurement resources and a plurality of interference measurement resources, the indicators being different from reference signal received power; and
   a transmitter that reports one or more indicators among the plurality of indicators and one or more indices that are associated with resources used for measurement of the one or more indicators,
   wherein the one or more indices each correspond to a combination of one of the channel measurement resources and one of the interference measurement resources, and
   wherein the transmitter reports capability information indicating a maximum number of the plurality of channel measurement resources and capability information indicating a maximum number of the plurality of interference measurement resources.

2. The terminal according to claim 1, wherein the transmitter does not report an interference measurement resource index.

3. The terminal according to claim 1, wherein
   the channel measurement resources are at least either synchronization signal/physical broadcast channel (SS/

PBCH) block resources or non-zero power channel state information reference signal (NZP CSI-RS) resources, and the interference measurement resources are NZP CSI-RS resources or CSI-Interference Management (IM) resources.

4. The terminal according to claim 1, wherein the indicators are Signal to Interference plus Noise Ratio (SINR).

5. A radio communication method for a terminal, comprising:

measuring a plurality of indicators based on a plurality of channel measurement resources and a plurality of interference measurement resources, the indicators being different from reference signal received power;

reporting one or more indicators among the plurality of indicators and one or more indices that are associated with resources used for measurement of the one or more indicators, wherein the one or more indices each correspond to a combination of one of the channel measurement resources and one of the interference measurement resources; and reporting capability information indicating a maximum number of the plurality of channel measurement resources and capability information indicating a maximum number of the plurality of interference measurement resources.

6. A base station comprising:

a processor that indicates a plurality of indicators based on a plurality of channel measurement resources and a plurality of interference measurement resources, the indicators being different from reference signal received power; and a receiver that receives reporting of one or more indicators among the plurality of indicators and one or more indices that are associated with resources used for measurement of the one or more indicators, wherein the one or more indices each correspond to a combination of one of the channel measurement resources and one of the interference measurement resources, and wherein the receiver receives capability information indicating a maximum number of the plurality of channel measurement resources and capability information indicating a maximum number of the plurality of interference measurement resources.

7. A system comprising: a base station; and a terminal, the base station comprising:

a processor that indicates a plurality of indicators based on a plurality of channel measurement resources and a plurality of interference measurement resources, the indicators being different from reference signal received power; and a receiver that receives reporting of one or more indicators among the plurality of indicators and one or more indices that are associated with resources used for measurement of the one or more indicators, and the terminal comprising:

a processor that measures the plurality of indicators based on the plurality of channel measurement resources and the plurality of interference measurement resources; and a transmitter that reports the one or more indicators and the one or more indices, wherein the one or more indices each correspond to a combination of one of the channel measurement resources and one of the interference measurement resources, and wherein the transmitter reports capability information indicating a maximum number of the plurality of channel measurement resources and capability information indicating a maximum number of the plurality of interference measurement resources.

* * * * *